(12) United States Patent
Kinoshita

(10) Patent No.: US 7,898,556 B2
(45) Date of Patent: Mar. 1, 2011

(54) DISPLAY DEVICE AND DRIVING METHOD AND TERMINAL DEVICE THEREOF

(75) Inventor: Kouhei Kinoshita, Fukaya (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 777 days.

(21) Appl. No.: 11/847,376

(22) Filed: Aug. 30, 2007

(65) Prior Publication Data

US 2007/0296664 A1 Dec. 27, 2007

Related U.S. Application Data

(63) Continuation of application No. PCT/JP2006/324777, filed on Dec. 12, 2006.

(30) Foreign Application Priority Data

Jan. 13, 2006 (JP) .................................. 2006-006273

(51) Int. Cl.
 *G09G 5/10* (2006.01)
(52) U.S. Cl. ............................ 345/690; 345/87; 345/89
(58) Field of Classification Search ............ 345/87–100, 345/204, 690
 See application file for complete search history.

(56) References Cited

U.S. PATENT DOCUMENTS

| 6,943,763 | B2* | 9/2005 | Shibata et al. | 345/89 |
| 7,158,107 | B2* | 1/2007 | Kawabe et al. | 345/89 |
| 7,724,228 | B2* | 5/2010 | Lee et al. | 345/96 |
| 2003/0011553 | A1* | 1/2003 | Ozaki | 345/89 |
| 2003/0117422 | A1* | 6/2003 | Hiyama et al. | 345/690 |
| 2004/0135755 | A1* | 7/2004 | Hong | 345/89 |

FOREIGN PATENT DOCUMENTS

| JP | 8-172610 A | 7/1996 |
| JP | 11-288245 A | 10/1999 |
| JP | 2000-250486 A | 9/2000 |
| JP | 2000-287203 A | 10/2000 |
| JP | 2004-96223 | 3/2004 |

* cited by examiner

*Primary Examiner* — Kimnhung Nguyen
(74) *Attorney, Agent, or Firm* — Oblon, Spivak, McClelland, Maier & Neustadt, L.L.P.

(57) ABSTRACT

A display method can be flexibly applied to suppress the power consumption and a device and display method which can reduce the power consumption while the image quality is prevented from being deteriorated are provided. A display device which can be operated in a progressive mode and interlace mode includes a display portion having a plurality of pixels arranged thereon and a gradation correction table which stores data used to correct a difference between a gradation level when the display portion is driven in the progressive mode and a gradation level when it is driven in the interlace mode. Then, when video data supplied to the display portion is set in the interlace mode, a timing controller corrects the video data by use of data in the gradation correction table.

5 Claims, 9 Drawing Sheets

| Gradation (A1) | Luminance Progressive (A2) | Luminance Interlace (A3) | A4 | A5 | A6 | A7 | A8 | A9 | A10 | A11 | A12 |
|---|---|---|---|---|---|---|---|---|---|---|---|
| 63 | 352.0 | 350.3 |  |  |  |  |  |  |  |  |  |
| 62 | 350.1 | 349.1 |  |  |  |  |  |  |  |  |  |
| 61 | 345.6 | 345.7 |  |  |  |  |  |  |  |  |  |
| 60 | 340.2 | 341.5 |  |  |  |  |  |  |  |  |  |
| 59 | 333.4 | 336.2 |  |  |  |  |  |  |  |  |  |
| 58 | 324.6 | 328.1 |  |  |  |  |  |  |  |  |  |
| 57 | 315.8 | 321.5 |  |  |  |  |  |  |  |  |  |
| 56 | 305.6 | 312.9 |  |  |  |  |  |  |  |  |  |
| 55 | 297.1 | 305.4 |  |  |  |  |  |  |  |  |  |
| 54 | 288.1 | 297.3 |  |  |  |  |  |  |  |  |  |
| 53 | 278.5 | 288.6 | -24.50 |  |  |  |  |  |  |  |  |
| 52 | 271.4 | 282.5 | -21.10 | -16.90 |  |  |  |  |  |  |  |
| 51 | 264.6 | 276.3 | -16.90 | -15.70 | -10.10 |  |  |  |  |  |  |
| 50 | 257.4 | 269.7 | -11.60 | -12.30 | -8.90 | -4.70 |  |  |  |  |  |
| 49 | 249.8 | 263.0 | -4.20 | -8.10 | -5.50 | -3.50 | -0.20 |  |  |  |  |
| 48 | 242.4 | 255.9 | 3.10 | -2.80 | -1.30 | -0.10 | 1.00 | 1.70 |  |  |  |
| 47 | 235.8 | 249.7 | 11.70 | 4.60 | 4.00 | 4.10 | 4.40 | 2.90 |  |  |  |
| 46 | 228.9 | 243.1 | 19.20 | 11.90 | 11.40 | 9.40 | 8.60 | 6.30 |  |  |  |
| 45 | 222.1 | 236.7 | 27.30 | 20.50 | 18.70 | 16.80 | 13.90 | 10.50 |  |  |  |
| 44 | 215.2 | 230.1 | -38.80 | 28.00 | 27.30 | 24.10 | 21.30 | 15.80 |  |  |  |
| 43 | 208.1 | 223.3 | -32.70 | -39.90 | -40.80 | -41.50 | -43.40 | -40.70 | -39.10 |  |  |
| 42 | 201.2 | 216.5 | -26.50 | -31.20 | -32.70 | -34.00 | -34.80 | -33.40 | -31.70 |  |  |
| 41 | 194.3 | 209.7 | -19.90 | -25.10 | -24.00 | -25.90 | -27.30 | -24.80 | -24.40 |  |  |
| 40 | 187.3 | 202.8 | -13.20 | -18.90 | -17.90 | -17.20 | -19.20 | -17.30 | -15.80 | -15.90 |  |
| 39 | 180.3 | 195.9 | -6.10 | -12.30 | -11.70 | -11.10 | -10.50 | -9.20 | -8.30 | -7.30 |  |
| 38 | 173.4 | 189.1 | 0.10 | -5.60 | -5.10 | -4.90 | -4.40 | -0.50 | -0.20 | 0.20 | -5.70 |
| 37 | 166.6 | 182.2 | 6.70 | 1.50 | 1.60 | 1.70 | 1.80 | 5.60 | 8.50 | 8.30 | 2.90 |
| 36 | 159.8 | 175.4 | 13.10 | 7.70 | 8.70 | 8.40 | 8.40 | 11.80 | 14.60 | 17.00 | 10.40 |
| 35 | 153.3 | 168.6 | -42.80 | 14.30 | 14.90 | 15.50 | 15.10 | 18.40 | 20.80 | 23.10 | 18.50 |
| 34 | 146.7 | 161.9 | -36.00 | -42.40 | -41.90 | -41.90 | -40.70 | -40.90 | -40.80 | -40.50 | 27.20 |
| 33 | 140.1 | 155.3 | -29.20 | -35.80 | -35.50 | -35.50 | -34.50 | -33.80 | -34.10 | -33.90 | -40.10 |
| 32 | 133.9 | 148.7 | -22.40 | -29.00 | -28.90 | -28.00 | -27.90 | -27.60 | -27.00 | -27.20 | -33.90 |
| 31 | 130.2 | 144.9 | -15.50 | -22.20 | -22.10 | -22.00 | -21.50 | -21.00 | -20.80 | -20.10 | -27.30 |
| 30 | 126.6 | 141.0 | -8.60 | -15.40 | -15.30 | -15.20 | -14.90 | -14.60 | -14.20 | -13.90 | -20.60 |
| 29 | 122.9 | 137.1 | -1.80 | -8.50 | -18.50 | -8.40 | -8.10 | -8.00 | -7.80 | -7.30 | -13.50 |
|  |  |  | -5.10 | -1.60 | -1.60 | -1.60 | -1.30 | -1.20 | -1.20 | -0.90 | -7.30 |
|  |  |  | 11.90 | 5.20 | 5.30 | 5.30 | 5.50 | 5.60 | 5.60 | 5.70 | -0.70 |
|  |  |  | -38.40 | 12.10 | 12.10 | 12.20 | 12.40 | 12.40 | 12.40 | 12.30 | 5.70 |
|  |  |  | -31.70 | -41.50 | -42.10 | -42.40 | -42.60 | -43.00 | -43.10 | -43.10 | 12.30 |
|  |  |  | -25.10 | -34.70 | -35.30 | -35.50 | -35.80 | -36.10 | -36.20 | -36.30 | -43.00 |
|  |  |  | -18.50 | -28.00 | -28.50 | -28.70 | -28.90 | -29.30 | -29.30 | -29.40 | -36.20 |
|  |  |  | -14.70 | -21.40 | -21.80 | -21.90 | -22.10 | -22.40 | -22.50 | -22.50 | -29.40 |
|  |  |  | -10.80 | -14.80 | -15.20 | -15.20 | -15.30 | -15.60 | -15.60 | -15.70 | -22.50 |
|  |  |  | -6.90 | -11.00 | -8.60 | -8.60 | -8.80 | -8.80 | -8.80 | -8.80 | -15.60 |
|  |  |  |  | -7.10 | -4.80 | -2.00 | -2.00 | -2.10 | -2.00 | -2.00 | -8.80 |
|  |  |  |  | -3.20 | -0.90 | 1.80 | 4.60 | 4.50 | 4.70 | 4.80 | -1.90 |
|  |  |  |  |  | 3.00 | 5.70 | 8.40 | 11.10 | 11.30 | 11.50 | 4.90 |
|  |  |  |  |  |  | -31.80 | -30.50 | -29.10 | -29.30 | -32.40 | 11.70 |
|  |  |  |  |  |  |  | -26.60 | -25.20 | -25.50 | -25.80 | -35.30 |
|  |  |  |  |  |  |  |  | -21.30 | -21.60 | -22.00 | -28.70 |
|  |  |  |  |  |  |  |  |  | -17.70 | -18.10 | -22.10 |
|  |  |  |  |  |  |  |  |  |  | -14.20 | -18.30 |
|  |  |  |  |  |  |  |  |  |  |  | -14.40 |
|  |  |  |  |  |  |  |  |  |  |  | -10.50 |

(B)

| Approximated gradation | Progressive gradation |
|---|---|
| 63 | 63 |
| 62 | 62 |
| 61 | 61 |
| 60 | 60 |
| 59 | 59 |
| 57 | 58 |
| 56 | 57 |
| 55 | 56 |
| 54 | 55 |
| 53 | 54 |
| 51 | 53 |
| 50 | 52 |
| 49 | 51 |
| 48 | 50 |
| 47 | 49 |
| 46 | 48 |
| 45 | 47 |
| 44 | 46 |
| 43 | 45 |
| 42 | 44 |
| 41 | 43 |
| 40 | 42 |
| 39 | 41 |
| 38 | 40 |
| 37 | 39 |
| 36 | 38 |
| 35 | 37 |
| 34 | 36 |
| 33 | 35 |
| 31 | 34 |
| 30 | 33 |
| 28 | 32 |
| 27 | 31 |
| 26 | 30 |
| 26 | 29 |

| | A1 | A2 | A3 | A4 | A5 | A6 | A7 | A8 | A9 | A10 | A11 | A12 | | | (B) | |
|---|---|---|---|---|---|---|---|---|---|---|---|---|---|---|---|---|
| (A) | 28 | 119.4 | 133.4 | -3.20 | 0.50 | -33.00 | -28.10 | -22.90 | -17.60 | -14.00 | -10.50 | -6.80 | | | 25 | 28 |
| | 27 | 115.8 | 129.6 | 0.60 | -33.96 | -29.20 | -24.30 | -19.10 | -13.80 | -10.20 | -6.70 | -3.00 | | | 24 | 27 |
| | 26 | 110.5 | 124.1 | -34.82 | -28.46 | -23.70 | -18.80 | -13.60 | -8.30 | -4.70 | -1.20 | 2.50 | | | 23 | 26 |
| | 25 | 105.3 | 118.5 | -29.22 | -22.86 | -18.10 | -13.20 | -8.00 | -2.70 | 0.90 | 4.40 | -35.29 | | | 23 | 25 |
| | 24 | 100.4 | 113.2 | -23.92 | -17.56 | -12.80 | -7.90 | -2.70 | 2.60 | 6.20 | -35.66 | -29.99 | | | 22 | 24 |
| | 23 | 95.6 | 108.0 | -18.72 | -12.36 | -7.60 | -2.70 | 2.50 | 7.80 | -37.14 | -30.46 | -24.79 | | | 21 | 23 |
| | 22 | 89.3 | 101.3 | -12.02 | -5.66 | -0.90 | 4.00 | 9.20 | -36.53 | -30.44 | -23.76 | -18.09 | | | 20 | 22 |
| | 21 | 83.2 | 94.7 | -5.43 | 0.93 | 5.69 | 10.59 | -35.82 | -29.94 | -23.85 | -17.17 | -11.50 | | | 19 | 21 |
| | 20 | 77.5 | 88.6 | 0.69 | 7.05 | 11.81 | -36.09 | -29.70 | -23.82 | -17.73 | -11.05 | -5.38 | | | 19 | 20 |
| | 19 | 70.9 | 80.9 | 8.41 | 14.77 | -40.60 | -28.37 | -21.98 | -16.10 | -10.01 | -3.33 | 2.34 | | | 17 | 19 |
| | 18 | 64.8 | 74.1 | 15.22 | -43.39 | -33.79 | -21.56 | -15.17 | -9.29 | -3.20 | 3.48 | 9.15 | | | 17 | 18 |
| | 17 | 58.9 | 67.7 | -45.55 | -37.06 | -27.46 | -15.23 | -8.84 | -2.96 | 3.13 | 9.81 | 15.48 | | | 16 | 17 |
| | 16 | 52.5 | 60.6 | -38.38 | -29.89 | -20.29 | -8.06 | -1.67 | 4.21 | 10.30 | 16.98 | -44.48 | | | 15 | 16 |
| | 15 | 40.3 | 46.6 | -24.47 | -15.98 | -6.38 | 5.85 | 12.24 | 18.12 | 24.21 | -35.00 | -30.57 | | | 14 | 15 |
| | 14 | 30.7 | 35.7 | -13.49 | -5.00 | 4.60 | 16.83 | 23.22 | 29.10 | -27.84 | -24.02 | -19.59 | | | 13 | 14 |
| | 13 | 22.2 | 25.9 | -3.76 | 4.73 | 14.33 | 26.56 | 32.95 | -20.23 | -17.84 | -14.29 | -9.86 | | | 12 | 13 |
| | 12 | 16.1 | 18.7 | 3.46 | 11.95 | 21.55 | 33.78 | -14.97 | -13.01 | -10.62 | -7.70 | -2.64 | | | 11 | 12 |
| | 11 | 11.7 | 13.6 | 8.59 | 17.08 | 26.68 | -11.07 | -9.84 | -7.88 | -5.49 | -1.94 | 2.49 | | | 10 | 11 |
| | 10 | 8.1 | 9.4 | 12.75 | 21.24 | -7.69 | -6.91 | -5.67 | -3.72 | -1.33 | 2.22 | 6.65 | | | 9 | 10 |
| | 9 | 5.7 | 6.6 | 15.58 | -5.39 | -4.86 | -4.08 | -2.85 | -0.89 | 1.50 | 5.05 | 9.48 | | | 9 | 9 |
| | 8 | 3.8 | 4.3 | -3.38 | -3.08 | -2.55 | -1.77 | 0.53 | 1.42 | 3.81 | 7.36 | 11.79 | | | 8 | 8 |
| | 7 | 2.5 | 2.9 | -1.96 | -1.65 | -1.13 | -0.34 | 0.89 | 2.85 | 5.24 | 8.78 | -2.17 | | | 7 | 7 |
| | 6 | 1.7 | 1.9 | -1.03 | -0.72 | -0.20 | 0.59 | 1.82 | 3.77 | 6.17 | -1.36 | -1.24 | | | 6 | 6 |
| | 5 | 1.2 | 1.4 | -0.46 | -0.15 | 0.38 | 1.16 | 2.39 | 4.35 | -0.83 | -0.79 | -0.66 | | | 5 | 5 |
| | 4 | 0.9 | 1.0 | -0.05 | 0.26 | 0.78 | 1.57 | 2.80 | -0.49 | -0.42 | -0.38 | -0.26 | | | 4 | 4 |
| | 3 | 0.7 | 0.7 | 0.19 | 0.50 | 1.03 | 1.81 | -0.24 | -0.11 | -0.18 | -0.14 | -0.01 | | | 3 | 3 |
| | 2 | 0.6 | 0.6 | 0.33 | 0.64 | 1.16 | | -0.11 | -0.07 | -0.04 | 0.00 | 0.12 | | | 2 | 2 |
| | 1 | 0.5 | 0.5 | 0.37 | 0.68 | | | -0.07 | -0.01 | -0.04 | 0.04 | 0.16 | | | 1 | 1 |
| | 0 | 0.5 | 0.5 | 0.42 | | | | | | 0.06 | 0.10 | 0.22 | | | 0 | 0 |

Progressive luminance−interlace luminance

FIG. 3

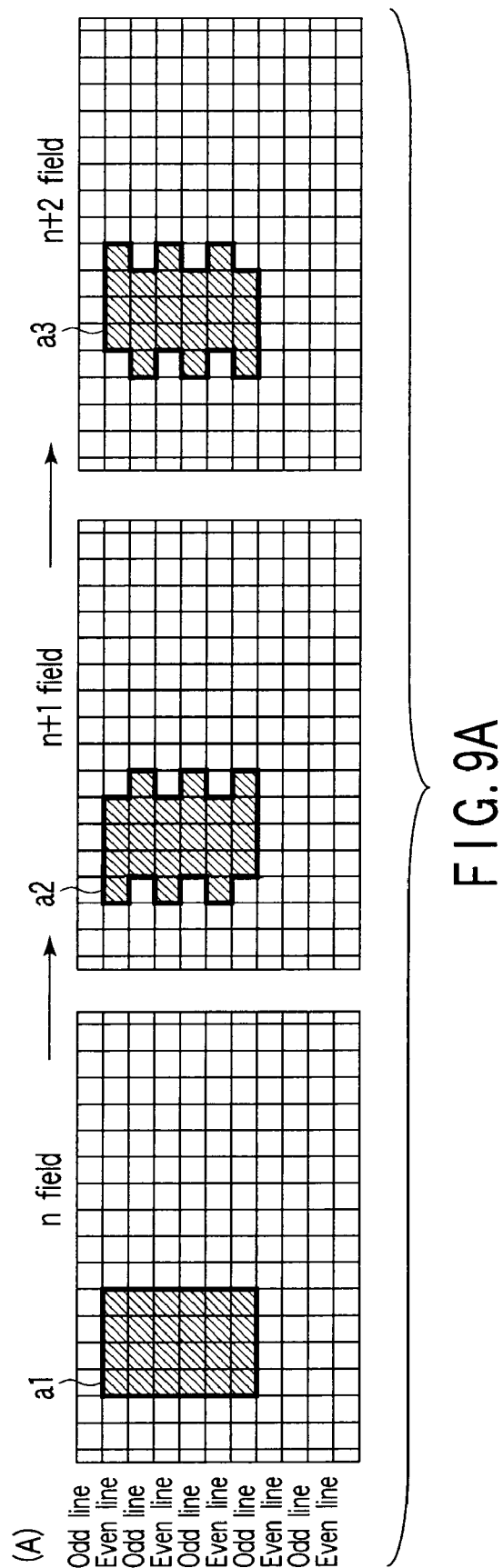

DISPLAY DEVICE AND DRIVING METHOD AND TERMINAL DEVICE THEREOF

CROSS REFERENCE TO RELATED APPLICATIONS

This is a Continuation Application of PCT Application No. PCT/JP2006/324777, filed Dec. 12, 2006, which was published under PCT Article 21(2) in Japanese.

This application is based upon and claims the benefit of priority from prior Japanese Patent Application No. 2006-006273, filed Jan. 13, 2006, the entire contents of which are incorporated herein by reference.

BACKGROUND OF THE INVENTION

1. Field of the Invention

This invention relates to a display device, a driving method and terminal device thereof and more particularly to the improvement on a problem occurring when switching between progressive driving and interlace driving is made and a problem relating to the power consumption.

2. Description of the Related Art

Recently, various types of mobile apparatus having display portions are developed. As one example of a mobile apparatus having a display portion, a notebook size personal computer (which is hereinafter referred to as a note PC) having a liquid crystal display device is provided. As one of factors which determine the value of the mobile apparatus having the display portion, the time during which the mobile apparatus can be driven by use of a battery is given. In order to increase the time during which the mobile apparatus can be battery-driven and used, it becomes necessary to suppress the power consumption of the whole mobile apparatus.

Generally, in the mobile apparatus having the display portion, the ratio of the power consumption of the display portion to the whole power consumption is high. Therefore, various methods for suppressing the power consumption of the display portion are developed. A case wherein the note PC having the liquid crystal display device is used as the mobile apparatus having the display portion is explained below.

As one example of the method for suppressing the power consumption of the note PC, a method for switching the driving methods of the liquid crystal display device according to the supply state of the power supply voltage is provided. For example, a method for making switching between progressive driving (or progressive mode) and interlace driving (or interlace mode) is provided. With this method, the liquid crystal display device is driven in a progressive (line-sequential) fashion in an environment in which electric power is always supplied from an electric outlet and driven in an interlace (thin-out) fashion in an environment in which it is supplied from a battery or the like (that is, in an environment in which supply of electric power is limited). In the case of interlace driving, the number of times by which the signal lines and scanning lines are driven in one vertical period are reduced to 1/n in comparison with the case of progressive driving and the interlace driving can be expected to extremely reduce the power consumption.

The technique for making switching between the interlace driving and progressive driving is disclosed in Patent Document 1 (Jpn. Pat. Appln. KOKAI Publication No. 2004-96223), for example. In this case, attention is paid to the fact that the precision of a converted signal is lowered in some cases when an interlace video signal is converted into a progressive video signal. In order to solve the above problem, a method is provided to detect the type of a sequence of an original interlace video signal and change the conversion processing state based on the detection result.

The interlace driving is a method for forming one image screen by superimposing (n+1) images in which n ($n \geq 1$) scanning lines are thinned out. In this method, the (n+1) images are images which complement one another. In the interlace driving, the number of times by which the signal lines and scanning lines are driven in one vertical period is reduced to 1/n. Therefore, the power consumption can be extremely reduced in comparison with that of the progressive driving. However, in the interlace driving, there occurs a problem that deterioration in the image quality, called line disturbance, occurs in a moving image portion.

Further, when attention is paid to a certain pixel, one driving operation is performed in one vertical period in the progressive driving, but the driving operation is performed only once in the (n+1) vertical periods in the interlace driving. If the interval in which the above driving operation is performed becomes long, the effective voltage applied to the pixel varies depending on the driving or on the property of the constituent material in some cases in the case of a liquid crystal display device. The phenomenon caused by the driving operation includes a leak phenomenon in which a pixel voltage is extracted via the parasitic capacitance formed between the signal line and the pixel electrode due to a video voltage signal supplied to the signal line. The phenomenon caused by the property of the constituent material includes natural discharging. Since the effective voltage applied to the pixel exerts an influence on the inclination of liquid crystal molecules, the luminance (transmittance) varies as a result. That is, even when the same gradation is displayed on the same liquid crystal display device, the luminance (brightness) becomes different in the case of progressive driving and in the case of interlace driving.

Further, in the interlace driving, the above (n+1) images are sequentially displayed. Therefore, when images having different colors and brightness with respect to the background are moved, deterioration in the display quality in which the boundary portion is observed as a jagged form (which is hereinafter referred to as "aliasing distortion") or line disturbance may occur. This is because images (scanning lines) updated in each field become images thinned out for every n scanning lines. Therefore, when the progressive driving and interlace driving are switched in the liquid crystal display device, the luminance becomes different at the progressive driving time and at the interlace driving time even with the same gradation. Therefore, the luminance of the whole display screen is observed as if it varies.

BRIEF SUMMARY OF THE INVENTION

An object of this invention is to provide a display device, a driving method and terminal device thereof which can display a stable image without causing a luminance variation even when switching is made between progressive driving and interlace driving operation and dynamically permit the switching from the progressive driving to the interlace driving or vice versa so as to attain power-saving.

In order to solve the above problem, according to one aspect of this invention, there is provided a display device which includes a display portion 25 having a plurality of pixels arranged in a two-dimensional form, a plurality of scanning lines arranged along the plurality of pixels for respective rows and a plurality of signal lines arranged along the plurality of pixels for respective columns, a scanning line drive circuit 24 which drives the plurality of scanning lines, a signal line drive circuit 23 which supplies video signals to the plurality of pixels via the plurality of signal lines, a timing controller 21 which controls the scanning line drive circuit and signal line drive circuit to drive the display portion 25 in a progressive mode or interlace mode, and a gradation correction table 22 which outputs correction data to correct a difference in a gradation level when the display portion is driven in the progressive mode in a case where the display portion 25 is driven in the interlace mode.

Further, according to another aspect of this invention, the gradation correction table is used to calculate differences between luminance values at the interlace mode driving time for selected gradation and a plurality of gradations before and after the selected gradation and a luminance value at the progressive mode driving time for each gradation used as a reference and set progressive gradation corresponding to gradation which makes an absolute value of the difference minimum as an approximated gradation at the interlace mode driving time.

BRIEF DESCRIPTION OF THE SEVERAL VIEWS OF THE DRAWING

FIG. 2 is a diagram showing a table which indicates the relation between the gradation and luminance when a liquid crystal panel is driven in a progressive fashion and driven in an interlace fashion and an approximated gradation selection table showing an example of a gradation correction table.

FIG. 3 is a continuation of the diagram of FIG. 2.

FIG. 9A is a diagram showing an example of deterioration in the image quality caused in the interlace mode.

DETAILED DESCRIPTION OF THE INVENTION

There will now be described embodiments of this invention with reference to the drawings.

Figure 1:
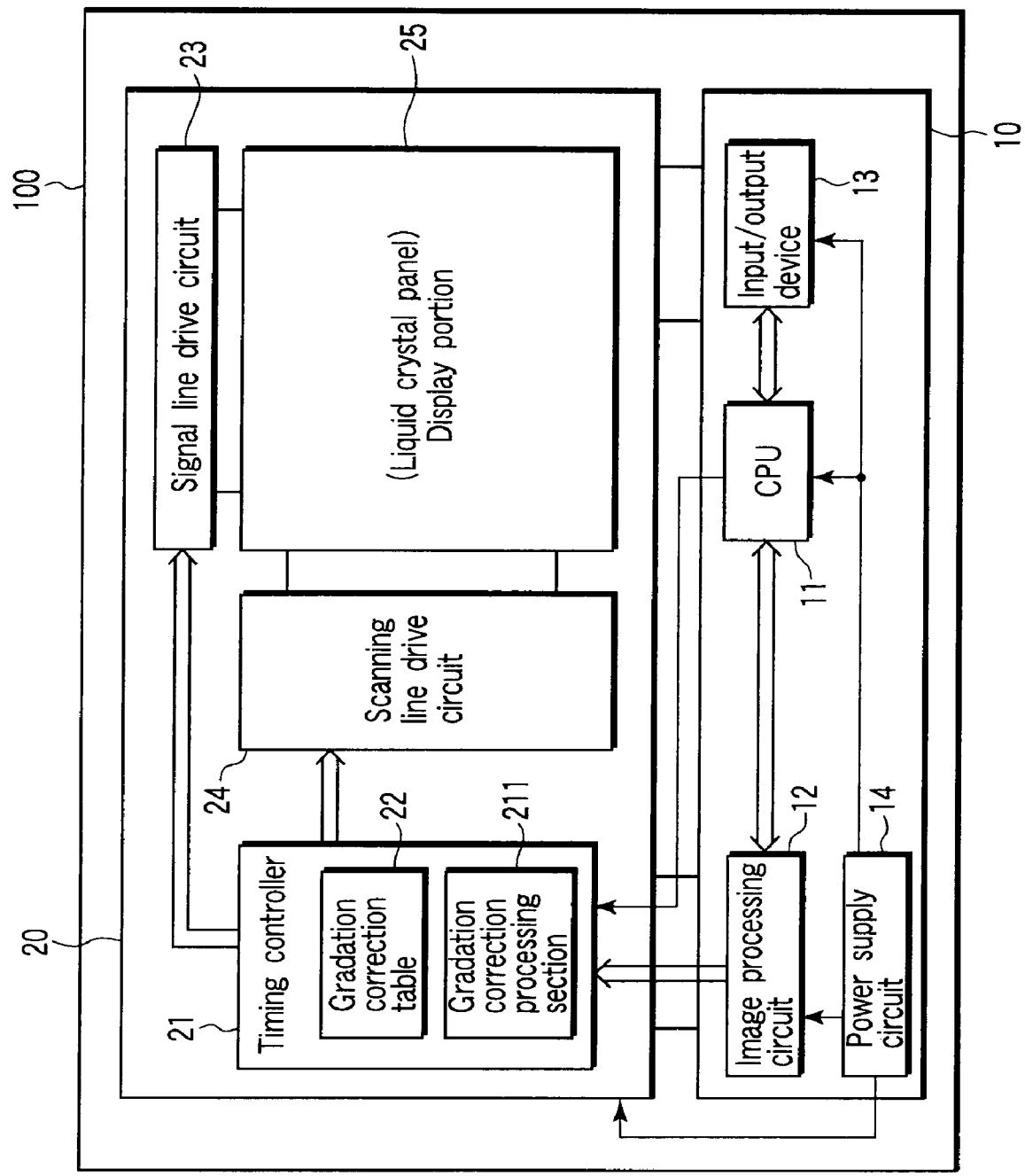
FIG. 1 is a block diagram showing an example of the circuit configuration of a display device according to one embodiment of this invention.

FIG. 1 is a block diagram showing the whole configuration of a terminal device 100 according to one embodiment of this invention. In this case, an example wherein a note PC having a liquid crystal panel is used as the terminal device is explained.

The terminal device 100 roughly includes a main device 10 and display device 20. The main device 10 includes a central processing unit (which is hereinafter referred to as a "CPU") 11 and an image processing circuit 12. The display device 20 includes a timing controller (which is hereinafter simply referred to as a "TCON") 21, gradation correction table 22, signal line drive circuit 23, scanning line drive circuit 24 and display portion 25 having a liquid crystal panel. In this portion, a plurality of pixels are arranged in a two-dimensional form. A plurality of scanning lines are arranged along the plurality of pixels for respective rows and a plurality of signal lines are arranged along the plurality of pixels for respective columns. The scanning line drive circuit 24 drives the plurality of scanning lines and the signal line drive circuit 23 supplies video signals to the plurality of pixels via the plurality of signal lines.

The CPU 11 provided in the main device 10 is connected to the image processing circuit 12 to control the operation thereof. An input/output device 13 is a memory or hard disk, for example. Further, the input/output device 13 may include a connection terminal which receives data from the exterior.

The image processing circuit 12 is connected to the TCON 21 provided in the display device 20. The image processing circuit 12 supplies a video data signal, sync signal and clock signal to the TCON 21 according to a protocol applied between the circuit and the display device 20.

The TCON 21 provided in the display device 20 includes the gradation correction table 22. The gradation correction table 22 is a table which stores approximated gradation data items obtained in the case of interlace driving with respect to respective gradation levels obtained in the case of progressive driving. Further, the TCON 21 is connected to the signal line drive circuit 23 and scanning line drive circuit 24 to control the above circuits. The TCON 21 can determine whether the display mode is set into the progressive mode or interlace mode according to the sequence of the sync signals supplied from the image processing circuit 12 of the main device 10 or a control signal from the CPU 11. Based on the result, the TCON 21 processes video data according to data of the gradation correction table 22 to perform the gradation correction. The processing operation may be performed by a gradation correction processing section 211 in the TCON 21. Alternatively, the TCON 21 itself may perform the processing operation of video data by controlling the gradation correction table 22.

The signal line drive circuit 23 supplies a video signal to the display portion 25 via the video signal lines of plural columns according to the control operation by the TCON 21. The scanning line drive circuit 24 sequentially drives the scanning lines of plural rows of the display portion 25 according to the control operation by the TCON 21.

The display portion 25 displays characters, still images, video images and the like. The display portion 25 has the scanning lines of plural rows and the video signal lines of plural columns as described before and pixels are arranged in intersecting portions between the scanning lines and the video signal lines. On the display portion 25, video images or the like are displayed in the display mode which is the progressive mode or interlace mode based on the result of determination by the TCON 21.

Numeral 14 denotes a power supply circuit. The power supply circuit 14 is a circuit which can cope with both of the commercial power supply and battery. The power supply circuit 14 supplies electric power to the main device 10 and display device 20. The CPU 11 determines whether the commercial power supply or the battery is used as a source of the power supply circuit 14.

The CPU 11 sets the display device 20 in the progressive mode when the commercial power supply is used. However, the CPU 11 instructs the TCON 21 to display progressive video data in the interlace mode when the battery is used. At this time, the gradation correction is made. Further, at this time, the power supply can be suppressed. However, when progressive video data is displayed in the interlace mode even if it is a moving image, the image quality is lowered as explained before. In such a case, the display state is automatically switched to the progressive mode.

The gradation correction table 22 is explained more in detail with reference to FIGS. 2 and 3.

A portion of (A) in FIGS. 2 and 3 is a table (the table is hereinafter referred to as a "table (A)") which indicates the relation between the gradation and luminance when the display portion, which is a liquid crystal panel, is driven in the progressive mode and driven in the interlace mode. A portion of (B) in FIGS. 2 and 3 is an example of the contents in the gradation correction table 22 (the table is hereinafter referred to as "table (B)").

In FIGS. 2 and 3, twelve columns, A1 to A12, are shown in the table (A). The leftmost column A1 indicates gradations (0 to 63). The second column A2 from the left end indicates luminance values corresponding to the respective gradations when the display portion is driven in the progressive mode, and the third column A3 from the left end indicates luminance values corresponding to the respective gradations when the display portion is driven in the interlace mode.

The remaining nine columns A4 to A12 indicate difference amounts obtained by subtracting the luminance values in the case of interlace driving from the luminance values in the case of progressive driving.

The nine columns of the table (A) are explained more in detail. Each of the nine columns includes a plurality of portions surrounded by thick-line frames (each portion is hereinafter referred to as a "sub-column"). For example, the rightmost column A12 has seven sub-columns. It is understood by referring to a portion surrounded by a broken line in the table (A) (a sub-column at the center of the seventh column A7 from the left end) that a difference numerical value "−15.20" of a $34^{th}$ gradation portion surrounded by the frame line is set to a value (−15.20=146.7−161.9) by subtracting the luminance value (161.9) in the case of interlace driving for the $34^{th}$ gradation from the luminance value (146.7) in the case of progressive driving for the $34^{th}$ gradation. Further, a value indicated below "−15.20" is "−8.60". The value is obtained by subtracting the luminance value (155.3) in the case of interlace driving for the $33^{rd}$ gradation from the luminance value (146.7) in the case of progressive driving for the $34^{th}$ gradation (−8.60=146.7−155.3). Further, a value indicated below "−8.60" is "−2.00". The value is obtained by subtracting the luminance value (148.7) in the case of interlace driving for the $32^{nd}$ gradation from the luminance value (146.7) in the case of progressive driving for the $34^{th}$ gradation (−2.00=146.7−148.7). Further, a value indicated below "−2.00" is "1.80". The value is obtained by subtracting the luminance value (144.9) in the case of interlace driving for the $31^{st}$ gradation from the luminance value (146.7) in the case of progressive driving for the $34^{th}$ gradation (1.80=146.7−144.9).

Further, a value indicated below "1.80" is "5.70". The value is obtained by subtracting the luminance value (141.0) in the case of interlace driving for the $30^{th}$ gradation from the luminance value (146.7) in the case of progressive driving for the $34^{th}$ gradation (5.70=146.7−141.0).

Next, a value indicated above "−15.20" is "−21.90". The value is obtained by subtracting the luminance value (168.6) in the case of interlace driving for the $35^{th}$ gradation from the luminance value (146.7) in the case of progressive driving for the $34^{th}$ gradation (−21.90=146.7−168.6). Further, a value indicated above "−21.90" is "−28.70". The value is obtained by subtracting the luminance value (175.4) in the case of interlace driving for the $36^{th}$ gradation from the luminance value (146.7) in the case of progressive driving for the $34^{th}$ gradation (−28.70=146.7−175.4). Further, a value indicated above "−28.70" is "−35.50". The value is obtained by subtracting the luminance value (182.2) in the case of interlace driving for the $37^{th}$ gradation from the luminance value (146.7) in the case of progressive driving for the $34^{th}$ gradation (−35.50=146.7−182.2). Further, a value indicated above "−35.50" is "−42.40". The value is obtained by subtracting the luminance value (189.1) in the case of interlace driving for the $38^{th}$ gradation from the luminance value (146.7) in the case of progressive driving for the $34^{th}$ gradation (−42.40=146.7−189.1).

As described above, in each sub-column, basically, a value obtained by subtracting the luminance value in the case of interlace driving for gradation corresponding to the central row from the luminance value in the case of progressive driving for the above gradation is uniquely derived. Then, values obtained by subtracting luminance values in the case of interlace driving for gradations in the range of ±4 of the above gradation from the luminance value in the case of progressive driving for the above gradation are used as a reference with the above fundamental row set as a center (however, the sub-columns of the uppermost and/or lowermost portions of parts of the columns in the table (A) are excluded).

In each sub-column, it is indicated that the luminance for the gradation in the case of interlace driving for a row corresponding to the smallest absolute numerical value among the numerical values contained in the sub-column is nearest to the luminance value in the case of progressive driving for gradation corresponding to the central row of the sub-column.

For example, the smallest absolute numerical value of 1.80 in the sub-column is selected in the case of the sub-column surrounded by a broken line in the column A7 and the row corresponds to the $31^{st}$ gradation. Therefore, if the gradation in the case of progressive driving is "34" as shown in the table (B), the $31^{st}$ gradation is set as the approximated gradation in the conversion table instead of the $34^{th}$ gradation in the case of interlace driving. In the same manner, the approximated gradations at the interlace driving time are set for respective sub-columns.

The table (B) is formed based on the above rule and is a list indicating that each gradation in the case of switching from the progressive driving to the interlace driving is closely related to one of gradations in the case of progressive driving in the interlace driving. That is, the table (B) is a list indicating gradations for interlace driving which are closely related to gradations at the progressive driving time. The table (B) configures the gradation correction table 22.

Thus, differences between luminance values at the interlace driving time and luminance values at the progressive driving time for a plurality of gradations before and after the set gradation with the gradation in the case of progressive driving set as a reference are calculated and the gradation corresponding to one of the differences which has the smallest absolute value is set as the approximated gradation at the interlace driving time for each gradation.

The contents of the gradation correction table 22 differ depending on the design and settings of the properties of the members configuring the display portion 25 such as liquid crystal and gradation curves.

Figure 4:
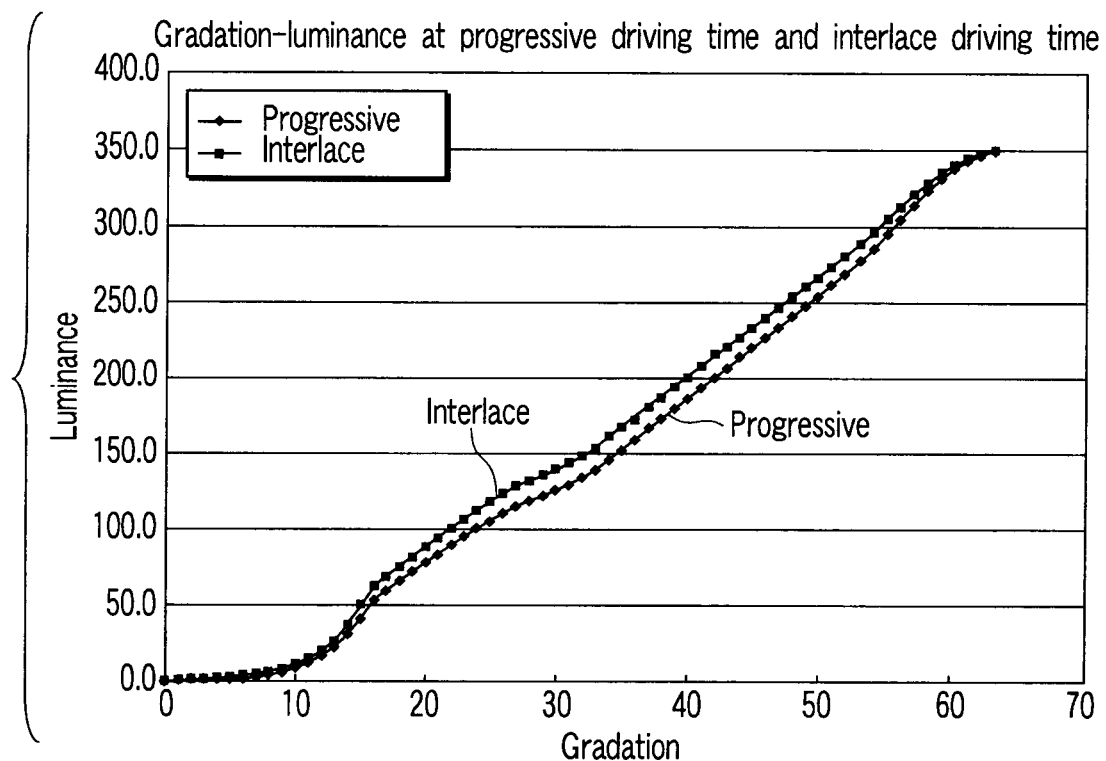
FIG. 4 is a diagram showing graphs which indicate the gradation-luminance relations in the case of progressive driving and in the case of interlace driving.
Figure 5:
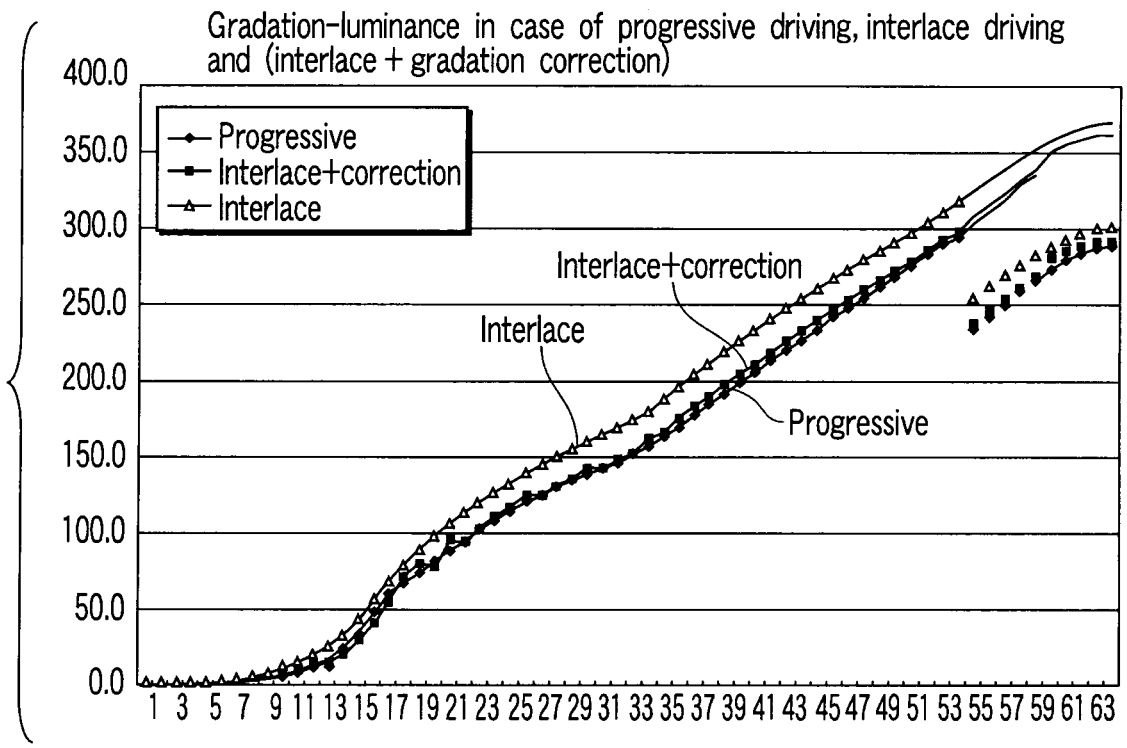
FIG. 5 is a diagram showing graphs which indicate the gradation-luminance relations in the case of progressive driving and in a case wherein gradation correction is made in interlace driving.

Next, the operation of the TCON 21 is explained more in detail with reference to FIGS. 4 and 5. FIG. 4 shows graphs which indicate the gradation-luminance relations in the cases of progressive driving and interlace driving and indicates that the luminance values in the cases of progressive driving and interlace driving are different even when the same gradation is set. FIG. 5 shows graphs which indicate the gradation-luminance relations in the case of progressive driving and in a case where the gradation correction is made in the case of interlace driving.

The TCON 21 determines whether a signal (sync signal+ video data signal) received from the image processing circuit 12 is in a progressive mode or interlace mode according to the protocol between the TCON 21 and the image processing circuit 12. When the interlace mode is determined, the gradation of video data in the progressive mode supplied from the image processing circuit 12 is converted according to the gradation correction table 22.

The gradation correction table 22 is formed as described above, and therefore, it becomes possible to set gradations for interlace driving which are more closely related to gradations at the progressive driving time even when switching is made from the progressive driving to the interlace driving. As a result, the luminance difference at the time of switching between the above two driving modes can be reduced and a variation in the luminance at the switching time can be suppressed.

FIG. 5 shows graphs indicating the gradation-luminance relations in the case of interlace driving performed by use of video data processed according to the gradation correction table 22. As is understood from FIG. 5, the gradation curve in a case where the gradation correction is made and the interlace driving is performed is nearly superimposed on the gradation curve in the case of progressive driving. In the experiments, the difference in brightness which can be visually observed when switching is dynamically made between the progressive driving and the interlace driving can be suppressed to a level at which it cannot be visually observed.

Further, when the difference in brightness is set at a level at which it can be visually observed even if the approximated gradation is used, levels obtained by further finely dividing one gradation by use of dithering or FRC (Frame Rate Control) can be applied.

In the above terminal device 100, the gradation correction table 22 is provided in the TCON 21 of the display device 20. However, the gradation correction table 22 can be provided in another portion of the display device 20. Further, the gradation correction table 22 can be provided in the main device 10.

Figure 6:
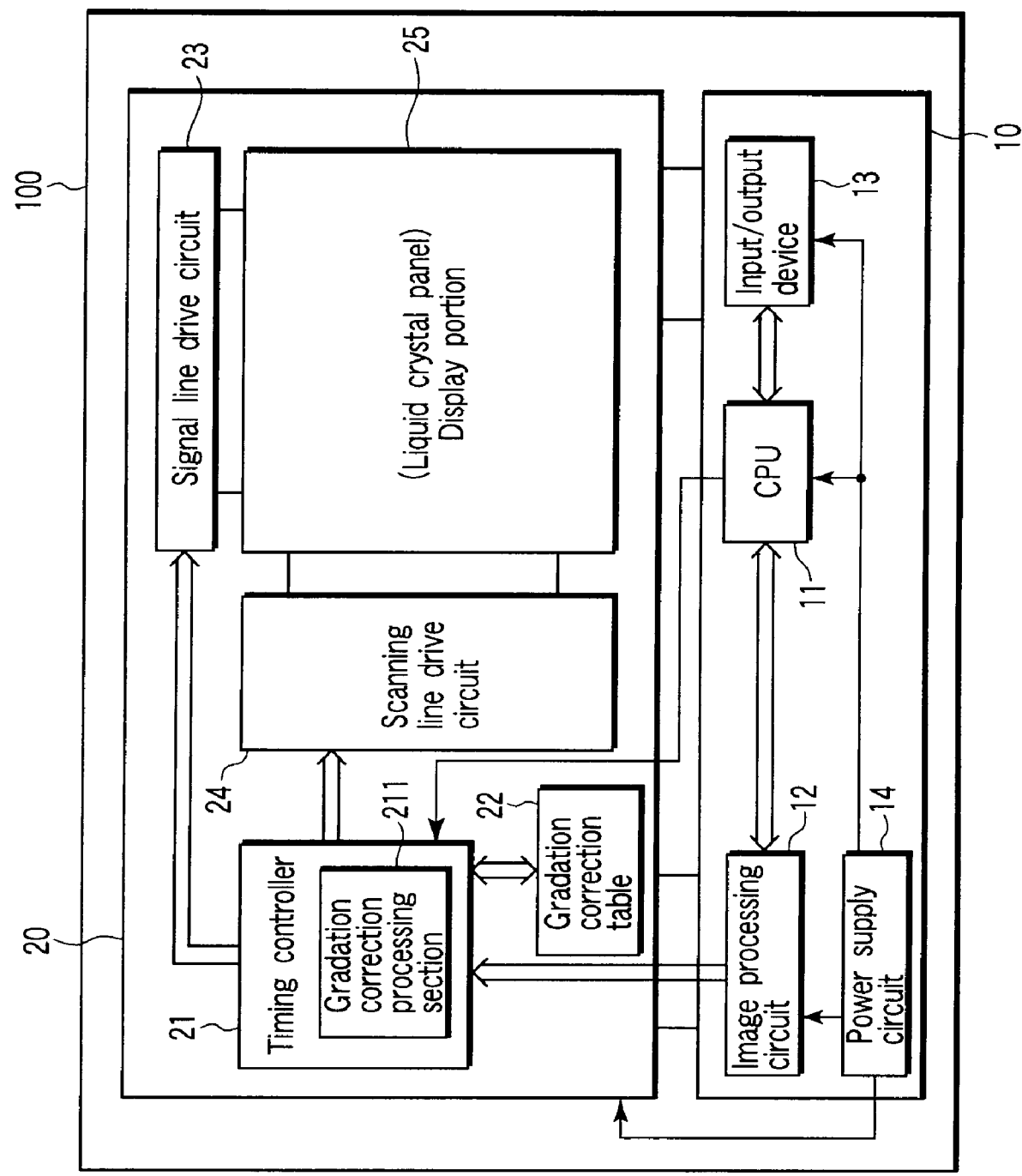
FIG. 6 is a block diagram showing an example of the circuit configuration of a display device according to another embodiment of this invention.
Figure 7:
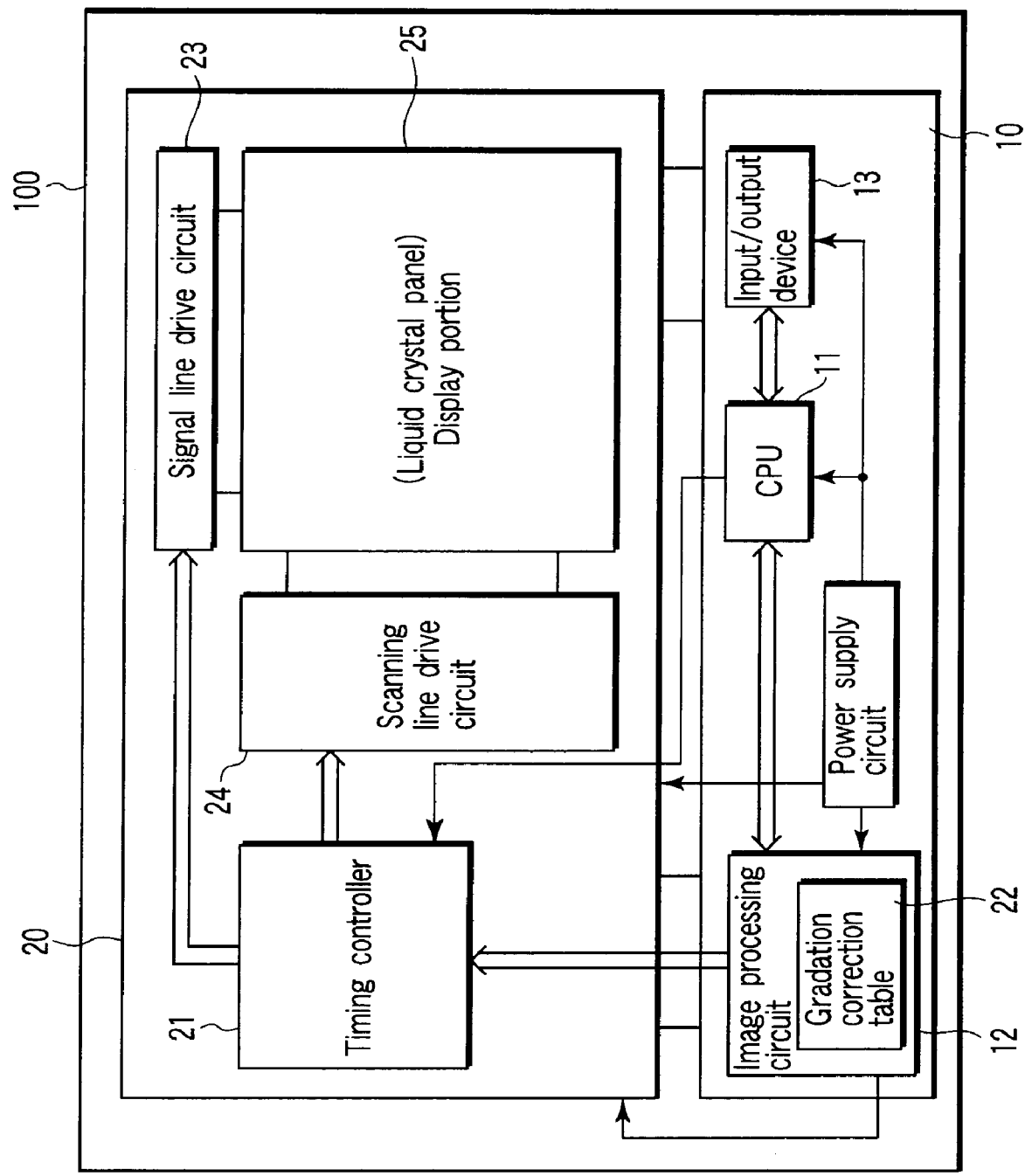
FIG. 7 is a block diagram showing an example of the circuit configuration of a display device according to still another embodiment of this invention.
Figure 8:
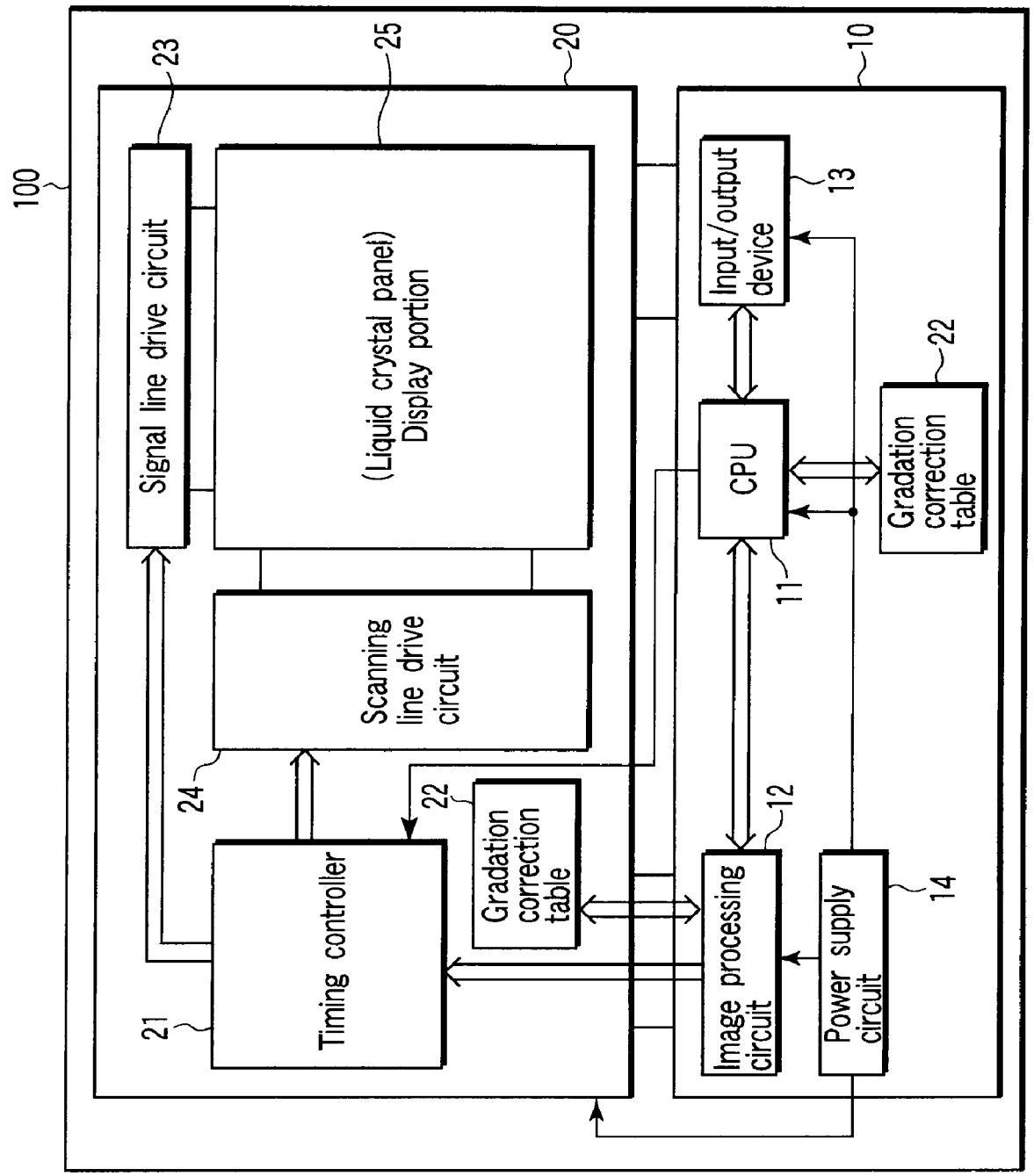
FIG. 8 is a block diagram showing an example of the circuit configuration of a display device according to another embodiment of this invention.

Next, an embodiment in which the gradation correction table 22 is provided in a portion other than the TCON 21 is explained with reference to FIGS. 6 to 8. In FIGS. 6 to 8, the same reference symbols as those of FIG. 1 denote the same elements and the explanation thereof is omitted.

FIG. 6 is a block diagram showing a terminal device 100 according to another embodiment of this invention. In the device 100, the gradation correction table 22 is provided outside the TCON 21. The gradation correction table 22 is configured in a device different from the TCON 21 and may be an EPROM, for example. The device 100 is configured so as to permit the TCON 21 to read out data of the gradation correction table 22.

The above device 100 can be applied to a case wherein the gradation correction is made in the display device 20.

FIG. 7 is a block diagram showing a device 100 according to a further embodiment of this invention. In the device 100 shown in FIG. 7, the gradation correction table 22 is provided in the image processing circuit 12 of the main device 10. Thus, in the case of the present embodiment, the gradation correction processing section can be provided in the image processing device 12.

FIG. 8 is a block diagram showing a device 100 according to another embodiment of this invention. In the device 100 shown in FIG. 8, both cases in which the gradation correction table 22 is provided in the main device 10 and provided on the display device 20 side are shown. When the gradation correction table 22 is provided in the display device 20, the image processing circuit 12 reads out the gradation correction table 22 in the display device 20. Further, when the gradation correction table 22 is provided on the main device 10 side, the image processing device 12 uses data in the gradation correction table 22 via the CPU 11.

The above device 100 can also be applied to a case wherein the gradation correction is made in the image processing circuit 12 of the main device 10. That is, in the case of the present embodiment, the gradation correction processing section 211 may be provided in the image processing device 12.

In the device 100, when a moving image is contained in the video signal supplied to the display device 20, for example, a sync signal is used as a protocol for interlace and a signal obtained by processing image data according to the gradation correction table 22 is supplied to the display device 20. If the gradation correction table 22 can be previously prepared, it can be provided as hardware, such as a ROM. Further, the gradation correction table 22 can be read out from a storage device (not shown) in the main device 10 by use of software.

When the gradation correction is made by the image processing circuit 12 in the main device 10, the gradation correction table 22 can be provided in the display device 20 instead of the main device 10. In this case, data of the gradation correction table 22 can be read out from the display device 20 at the power-ON time of the display device 20. In the case of a device connected to the network, data of the gradation correction table 22 can be read out from the exterior.

In the above embodiment, an example in which the note PC having the liquid crystal panel as the display device is used is explained, but this invention is not limited to this example. For example, this invention can be applied to a PDA (Personal Digit Assistant) or portable telephone having a liquid crystal display portion. Also, in this case, the same effect as that of the above embodiment can be attained.

Further, various inventions can be made by adequately combining a plurality of constituents disclosed in the above embodiments. For example, some constituents can be removed from all of the constituents shown in the embodiments. Further, the constituents of the different embodiments can be adequately combined.

Figure 9B:
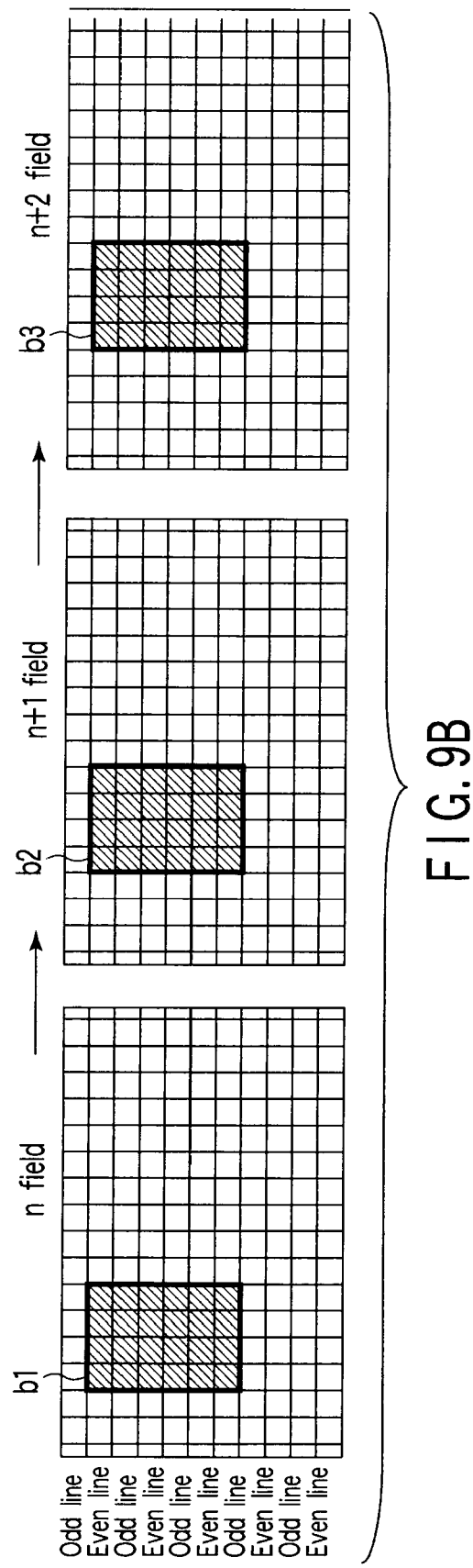
FIG. 9B is a diagram showing the image quality in the case of the progressive mode.

In FIGS. 9A, 9B, examples of moving images when aliasing distortion occurs and when no aliasing distortion occurs are shown to illustrate the effect of this invention. FIG. 9A shows an example of a case where the display device 20 is driven in the interlace fashion. In this case, it is supposed that an image a1 of an n-th field is a moving image which moves in the right direction. Then, a phenomenon that the image edge is jagged is observed as shown in an image a2 of an (n+1)-th field and an image a3 of an (n+2)-th field. On the other hand, FIG. 9B shows an example of a case where the display device 20 is driven in the progressive (non-interlace) fashion. In this case, it is supposed that an image b1 of an n-th field is a moving image which moves in the right direction. Then, the image edge becomes smooth as shown in an image b2 of an (n+1)-th field and an image b3 of an (n+2)-th field.

Therefore, in the device of this invention, the interlace driving is basically performed in an environment in which the lower power consumption is desired when the battery is used, for example. However, since the image quality is lowered when a moving image is input, the progressive driving is performed. Further, since the above gradation correction table is used, the average luminance will not vary on the entire screen.

For example, when this invention is applied to a personal computer, a cursor is moved when the mouse is operated or characters are input as a moving image and they move as an image in some cases. However, since the gradation correction table is used, a variation in the average luminance can be suppressed.

This invention is not limited to the above embodiments as it is and can be realized by modifying the constituents without departing from the technical scope thereof at the embodying stage. Further, various inventions can be made by adequately combining a plurality of constituents disclosed in the above embodiments. For example, some constituents can be removed from all of the constituents shown in the embodiments. Further, the constituents of the different embodiments can be adequately combined.

According to this invention, occurrence of a luminance difference between the progressive mode and the interlace mode can be suppressed. Further, a display method which can attain the low power consumption can be flexibly applied and the power consumption can be reduced while deterioration in the image quality is avoided.

This invention is applied to and is effective for display devices of a television receiver, personal computer, portable telephone, checking device and portable terminal device and a driving method thereof.

What is claimed is:

1. A display device comprising:
    a display portion having a plurality of pixels arranged in a two-dimensional form, a plurality of scanning lines arranged along the plurality of pixels for respective rows and a plurality of signal lines arranged along the plurality of pixels for respective columns,
    a scanning line drive circuit which drives the plurality of scanning lines,
    a signal line drive circuit which supplies video signals to the plurality of pixels via the plurality of signal lines,
    a timing controller which controls the scanning line drive circuit and signal line drive circuit to drive the display portion in a progressive mode or interlace mode, and
    a gradation correction table which outputs correction data to correct a difference in a gradation level when the display portion is driven in the progressive mode in a case where the display portion is driven in the interlace mode,
    wherein the gradation correction table is used to calculate the differences between luminance values at an interlace mode driving time for a selected gradation and a plurality of gradations before and after the selected gradation and a luminance value at a progressive mode driving time for each gradation used as a reference and to set a progressive gradation corresponding to a gradation which makes an absolute value of the difference minimum as an approximated gradation at the interlace mode driving time.

2. The display device according to claim 1, wherein the gradation correction table is provided in the timing controller.

3. The display device according to claim 1, wherein the gradation correction table is provided outside the timing controller.

4. A terminal device comprising:
    a display portion having a plurality of pixels arranged in a two-dimensional form, a plurality of scanning lines arranged along the plurality of pixels for respective rows and a plurality of signal lines arranged along the plurality of pixels for respective columns,
    a scanning line drive circuit which drives the plurality of scanning lines,
    a signal line drive circuit which supplies video signals to the plurality of pixels via the plurality of signal lines,
    a timing controller which controls the scanning line drive circuit and signal line drive circuit to supply image data to the display portion and drive the display portion in a progressive mode or interlace mode, and
    a gradation correction table which is provided in a main device which supplies image data to the timing controller and outputs correction data to correct a difference in a gradation level when the display portion is driven in the progressive mode in a case where the display portion is driven in the interlace mode,
    wherein the gradation correction table is used to calculate differences between luminance values at an interlace mode driving time for a selected gradation and a plurality of gradations before and after the selected gradation and a luminance value at a progressive mode driving time for each gradation used as a reference and to set a progressive gradation corresponding to a gradation which makes an absolute value of the difference minimum as an approximated gradation at the interlace mode driving time.

5. In a driving method of a display device which includes a display portion having a plurality of pixels arranged in a two-dimensional form, a plurality of scanning lines arranged along the plurality of pixels for respective rows and a plurality of signal lines arranged along the plurality of pixels for respective columns, a scanning line drive circuit which drives the plurality of scanning lines and a signal line drive circuit which supplies video signals to the plurality of pixels via the plurality of signal lines and controls the scanning line drive circuit and signal line drive circuit by use of a timing controller to drive the display portion in a progressive mode or interlace mode, the driving method of the display device comprising:
    determining whether the display portion is driven in the progressive mode or interlace mode, and
    outputting correction data used to correct a difference in a gradation level when the display portion is driven in the progressive mode in a case where the display portion is driven in the interlace mode,
    wherein the gradation correction table is used to calculate differences between luminance values at an interlace mode driving time for a selected gradation and a plurality of gradations before and after the selected gradation and a luminance value at a progressive mode driving time for each gradation used as a reference and to set a progressive gradation corresponding to a gradation which makes an absolute value of the difference minimum as an approximated gradation at the interlace mode driving time and an approximated gradation data of the gradation correction table is used at the interlace mode driving time.

* * * * *